(No Model.) 2 Sheets—Sheet 1.
N. B. SCOTT, L. SCHAUB & H. FEURHAKE.
FURNACE FOR THE MANUFACTURE OF GLASS.
No. 284,075. Patented Aug. 28, 1883.
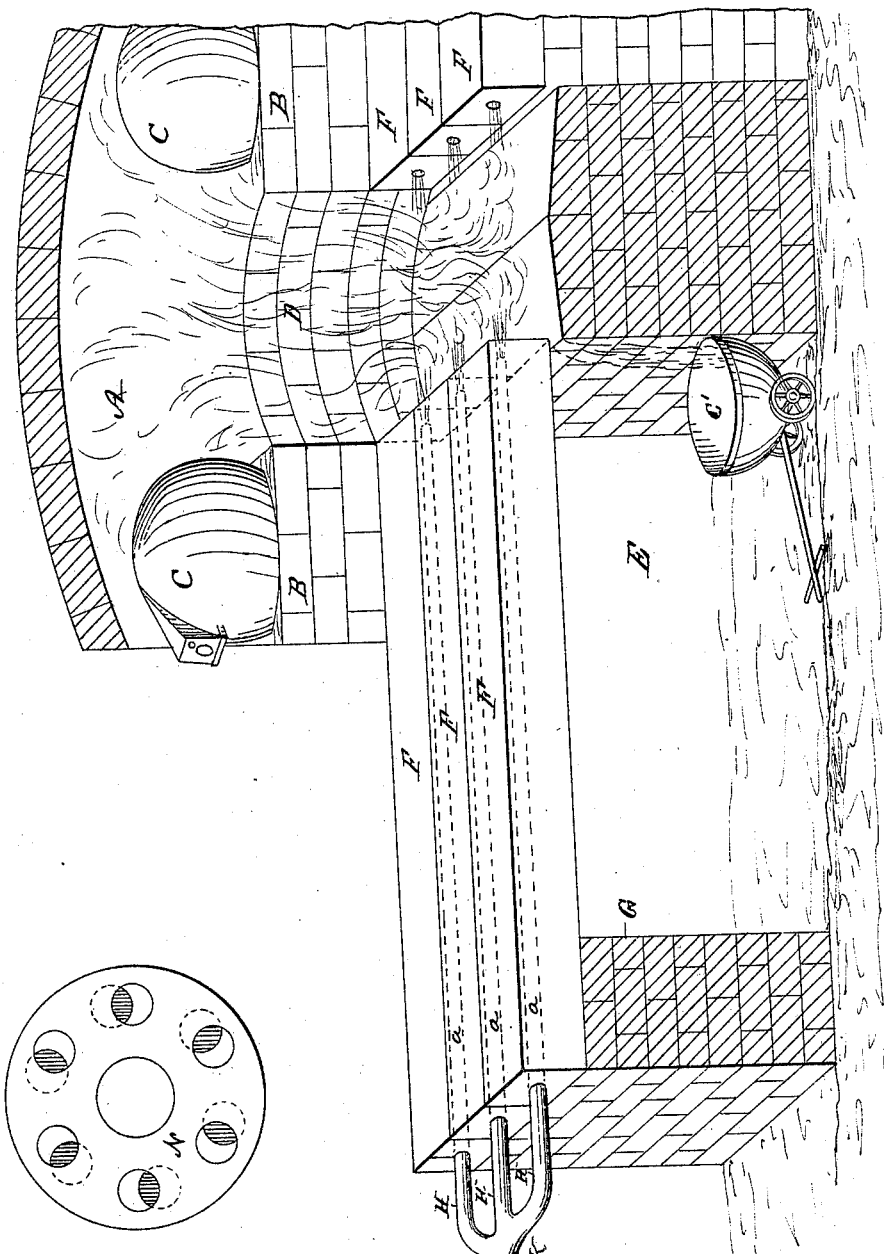

(No Model.) 2 Sheets—Sheet 2.
N. B. SCOTT, L. SCHAUB & H. FEURHAKE.
FURNACE FOR THE MANUFACTURE OF GLASS.
No. 284,075. Patented Aug. 28, 1883.
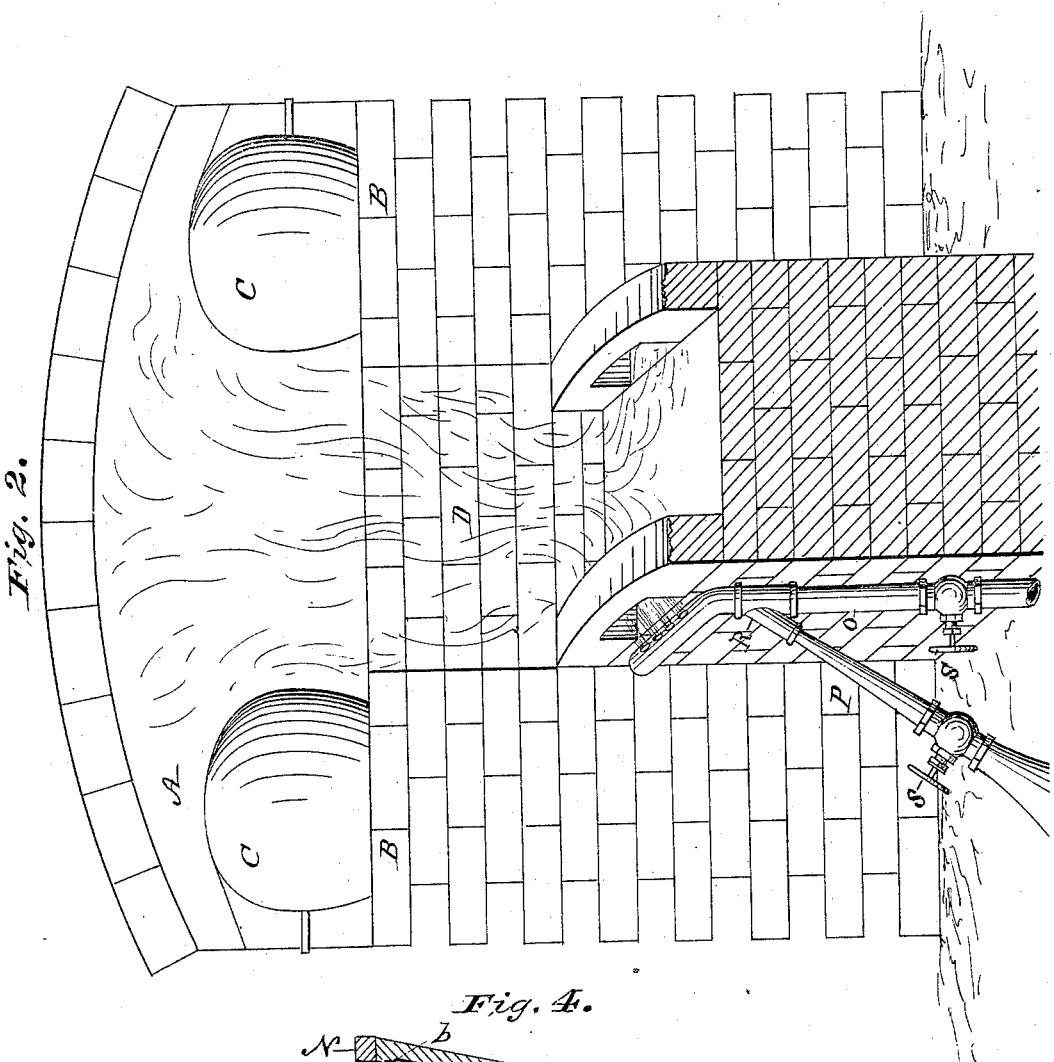
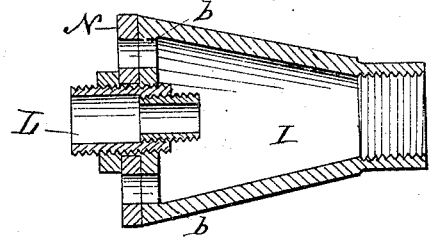
Witnesses:
Inventors:
N. B. Scott,
Louis Schaub,
Henry Feurhake,
By
Attorney

UNITED STATES PATENT OFFICE.

NATHAN B. SCOTT, LOUIS SCHAUB, AND HENRY FEURHAKE, OF WHEELING, WEST VIRGINIA.

FURNACE FOR THE MANUFACTURE OF GLASS.

SPECIFICATION forming part of Letters Patent No. 284,075, dated August 28, 1883.

Application filed August 1, 1883. (No model.)

*To all whom it may concern:*

Be it known that we, N. B. SCOTT, LOUIS SCHAUB, and HENRY FEURHAKE, citizens of the United States, residing at Wheeling, in the county of Ohio and State of West Virginia, have invented certain new and useful Improvements in Furnaces for the Manufacture of Glass, of which the following is a specification, reference being had therein to the accompanying drawings.

Our invention relates to the construction of furnaces for melting glass, and in devices for burning or utilizing the natural gases brought from subterranean deposits.

The object of our invention is to utilize the natural gases for melting, annealing, and reheating glass, by which means we produce a much better article, free from soot, smoke, ashes, and the discolorations caused by sulphurous fumes generated in the burning of the ordinary bituminous coal or the gases made therefrom.

For the sake of illustrating our invention we have seen fit to show a glass-melting furnace; but for annealing, fire-polishing, and finishing we may use the ordinary furnaces, or furnaces of special construction.

Referring to the drawings, Figure 1 is a view partly in perspective and partly in section, showing one form of devices for supplying gas and air to the melting-furnace. Fig. 2 is a view in elevation, showing a modified form of devices for supplying gas and air to a glass-melting furnace. Fig. 3 is an end view of a perforated disk used in regulating the supply of air to the gas in its passage from the well or reservoir to the combustion-chamber. Fig. 4 is a sectional view of the gas and air receiver with the air-regulating disk attached thereto.

A is the pot-chamber, having the usual bench, B, on which the pots C are seated.

D is the eye or combustion-chamber of the furnace, through which the products of combustion enter the chamber A, the bottom of which is made sloping to one or both sides, to allow the glass from broken pots to flow down into proper or suitable receptacles, C'.

E is the fire-bed of the furnace, used when slack or coal is burned, which we now convert into a pit to receive the overflow of glass from the broken pots.

F are elongated perforated bricks, made from pot-shells and fire-clay or other suitable material. These brick or gas and air conduits are supported at their outer ends on a pier of masonry, G, while their inner ends rest on the bottom of the combustion-chamber. The perforations or holes $a$ in the brick F are slightly larger in diameter at their outer ends than they are at their inner ends, in order that they may act much in the nature of a nozzle or blow-pipe.

H H H are pipes or tubes leading from the gas and air receiver I into the perforations $a$ in the bricks F. These pipes terminate in a single pipe or stem, K, to which the receiver I is attached.

I is a hollow cone-shaped gas and air receiver, the inner end of which is connected to the pipe K, while its outer end is connected to the gas-supply pipe L, which leads to the well, or to a reservoir in which the gas has been previously stored or gathered. The pipe L is provided with a suitable stop cock or valve, M, by which the flow of gas into the receiver is regulated. The rear end or base of the cone-shaped gas and air receiver is provided with a series of holes or apertures, $b$, through which atmospheric air is admitted to the receiver and mingles with the gas which enters through the supply-pipes L.

N is a perforated disk, secured on the gas-supply pipe L, in close juxtaposition to the base of the receiver. The perforations in the disk N are preferably of the same size and same number as the perforations $b$ in the receiver. They are also arranged in the same relative position, in order that they will match or register with each other. The office of the perforated disk is to control the amount of air to be admitted into the receiver to the best advantage to produce the most perfect combustion, and by having the holes arranged around the disk in the manner shown the air is admitted all around or on all sides of the jet or column of gas and intimately mixed therewith.

While we have shown only one of the gas and air receivers as applied to a furnace, we wish it understood that we do not limit ourselves to one, for it is obvious that they may be used all around and on all sides of the furnace. They may also be arranged in tiers one above another, and in such numbers and localities within the furnace as will give the best results. Neither do we wish to confine or limit ourselves to the use of the gas and air receiver as applied to glass-furnaces alone, for it is obvious that it can be used to great advantage in supplying gas and air to stoves, grates, and for other household or domestic uses, also to furnaces to generate steam, &c.

In Fig. 2 we have shown a modified form of apparatus for conveying the gas and air to the combustion-chamber, which we will now proceed to describe.

O is the gas-pipe, the upper end of which is perforated to allow the gas and air to escape into the combustion-chamber.

P is the air-pipe, which is connected to the gas-pipe O by a V-joint, R, both pipes—i. e., the pipes O and P—being provided with suitable valves, S, to stop or regulate the flow of gas or air. We may find it convenient and desirable to utilize the chamber E as a furnace, as well as a receptacle for the waste glass, and thereby heat the air and gas in their passage through the bricks or conduits F, so as to effect a more complete combustion, and in a measure free the gas from any watery vapor it may have as it comes from the well.

In practice we may find it desirable to store or gather the gas into reservoirs, in order that a constant and regular supply may be had, for it is a well-known phenomenon that this natural gas only flows at intervals, or at least flows more rapidly at some times than it does at others; hence the necessity of providing for a regular and uninterrupted flow of the gas to the furnace. By the use of this natural gas as a fuel in the manufacture of glass, the molten glass in the pots or tank is not subjected to the damaging and deteriorating effect of ashes, cinders, and smoke, while its application to the finishing, reheating, and annealing in glory-holes and leers is very advantageous and productive of the very best results, as the articles are not subjected to smoke or the discoloring fumes of sulphur.

We are aware that it is not broadly new to utilize the natural gases as fuel in metallurgical operations. We are also aware that it has been used in furnaces to generate steam, and to illuminate cities and towns. We are also aware that manufactured gas from bituminous coal has been used in the manufacture of glass, and that coal-oil has been used for the same purpose; but these are objectionable on account of the sulphurous fumes of the former and the dense smoke of the latter, and such we do not claim. We are not aware, however, that the natural gases such as we describe have ever been utilized in the manner set forth in the art of glass-manufacture prior to our invention.

Having thus described our invention, what we claim, and desire to secure by Letters Patent, is—

1. As an improvement in the art of manufacturing glass, the employment of natural gas taken from subterranean deposits, combined with atmospheric air in substantially the manner described, as a heating medium in the melting, heating, and reheating of glass, as and for the purpose set forth.

2. In furnaces for melting, annealing, and working glass, the pipes or tubes for conveying the gas from the gas-well or source of supply, and devices, substantially such as described, for mixing or mingling atmospheric air with the gas prior to its entrance into the combustion-chamber, as set forth.

3. An air and gas receiver and mixer consisting of a hollow cone-shaped compartment having gas and air inlets and an outlet, and a perforated disk arranged in contact with the perforated base of the receiver, for controlling the admission of air into said receiver and mixer.

4. The hollow cone-shaped receiver, provided with the perforations $b$, in combination with the perforated disk N, whereby the admission of atmospheric or other air into the receiver is controlled and regulated, as and for the purpose set forth.

5. In furnaces for manufacturing glass, the perforated tiles F, arranged to enter the combustion-chamber at one or more points, in combination with the pipes H H H K, receiver I, and gas-supply pipe L, as and for the purpose set forth.

In testimony whereof we affix our signatures in presence of two witnesses.

NATHAN B. SCOTT.
LOUIS SCHAUB.
HENRY FEURHAKE.

Witnesses:
WM. GARING,
JNO. CARMACK.